H. SCHWARTZ, Jr.
PEELING KNIFE FOR TIRES.
APPLICATION FILED AUG. 13, 1919.
1,402,097.
Patented Jan. 3, 1922.
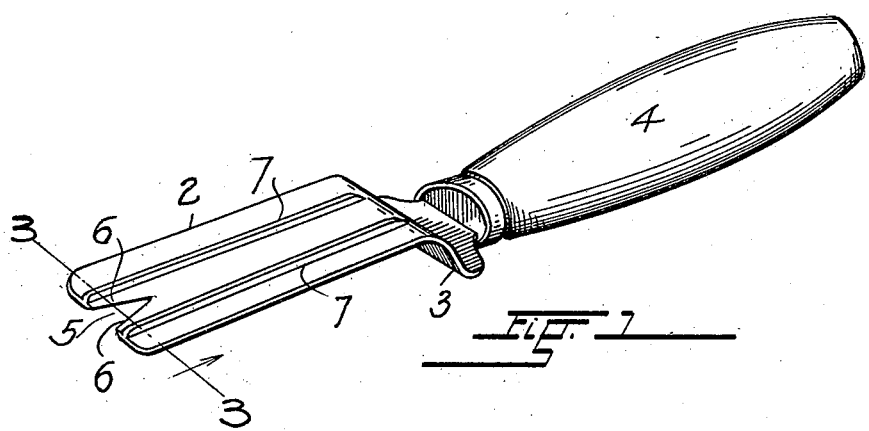
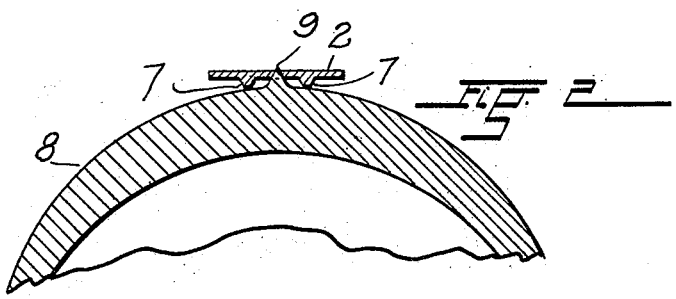
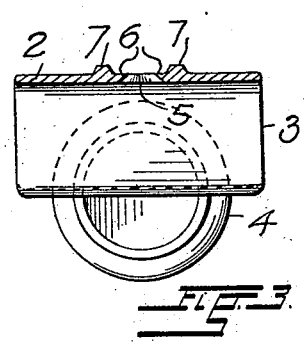
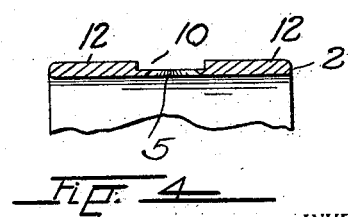
INVENTOR.
Henry Schwartz Jr.
BY
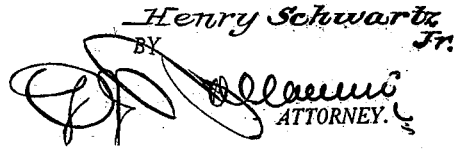
ATTORNEY.

ated Jan. 3, 1922.

UNITED STATES PATENT OFFICE.

HENRY SCHWARTZ, JR., OF DENVER, COLORADO, ASSIGNOR OF ONE-HALF TO JOHN H. HINCKE, OF DENVER, COLORADO.

PEELING KNIFE FOR TIRES.

1,402,097.	Specification of Letters Patent.	Patented Jan. 3, 1922.

Application filed August 13, 1919. Serial No. 317,331.

*To all whom it may concern:*

Be it known that I, HENRY SCHWARTZ, Jr., a citizen of the United States, residing at Denver, in the county of Denver and State of Colorado, have invented certain new and useful Improvements in Peeling Knives for Tires, of which the following is a specification.

This invention relates to knives used in the manufacture of rubber tires to remove the ridge of surplus rubber which is formed upon their circumference at the juncture of the two sections of the mold in which they are cast.

A tool of this character, commonly known as a peeling knife, consists in its present form of a blade of thin metal which is offset at the end of a shank by which it is fastened to a handle.

The blade has at its end a V-shaped notch the edges of which are sharpened to sever the ridge of surplus rubber of a pneumatic tire when the knife is moved along the peripheral surface thereof.

The ordinary use of the knife has been attended by certain difficulties principal among which has been the problem of cutting away the surplus rubber without digging into the body of the tire.

In factories where the tires are produced in large quantities, the ridges of the tires, commonly known as their rinds, are severed with great rapidity and without the care necessary to prevent the edges of the knife from cutting into the surface of the rubber. Grooving or "ditching" the tires is consequently a common occurrence with the result that the tires are weakened at the point of greatest wear.

It is the object of the present invention to provide in a peeling knife of the above-described character, gauges of highly effective though simple construction which prevent the cutting edge of the blade from engaging the surface of the tire and thereby cause the rind to be severed at a constantly uniform distance from said surface with less effort and care on the part of the workmen than is exercised in the manipulation of the knives at present in common use.

With the above object in view, my invention consists in forming upon the under surface of the knife-blade at opposite sides of its cutting notch, two bearing faces which engage the surface of the tire at opposite sides of its rind and thereby maintain the sharpened edges of the notch in spaced relation thereto.

An embodiment of my invention has been shown in the accompanying drawings in the several views of which like characters of reference designate corresponding parts and in which—

Figure 1 is a perspective view of the improved peeling knife in an inverted position;

Figure 2, a fragmentary section through the hood of a pneumatic tire showing a section of the knife-blade to illustrate the method of its use in severing the rind of the tire.

Figure 3, a section taken on the line 3—3, Figure 1, and

Figure 4, a transverse section of the knife-blade showing a modified form of construction.

Referring more specifically to the drawings, the reference character 2 designates the blade of the knife, made of thin steel and offset as at 3 from a shank by which it is fastened to a handle 4.

The blade has at its end a V-shaped notch 5 the edges 6 of which are beveled and sharpened.

Formed upon the under surface of the blade at opposite sides of its cutting notch are longitudinally extending ridges 7 which in the use of the knife gauge the depth at which the cutting edges of its blade sever the ridge of surplus rubber on the circumference of the tire.

The method of using the knife has been shown in Figure 2 of the drawings in which the reference character 8 designates a rubber tire, and 9 the rind at the periphery thereof. To sever this rind, the knife is pushed lengthwise along the circumference of the tire with its ribbed side facing the same.

The ribs by engaging the surface of the tire space the blade therefrom to the extent of their depth and grooving of the tire is in consequence effectively prevented.

In the form of my invention shown in Figure 4, the gauges are formed by grooving the blades longitudinally as at 10 and forming the V-shaped cutting-notch in the end of the groove.

The portions 12 at opposite sides of the groove are in this form of my invention the gauges which separate the cutting edge of the blade from the surface of the tire.

Having thus described my invention what I claim and desire to secure by Letters Patent is:

1. A peeling knife for tires, comprising a handle, a forwardly extending cutting blade having a V-shaped cutting edge at its forward end, and integral ribs at the under side of the blade forming a channel in alinement with the cutting edge.

2. A peeling knife for tires comprising a handle, and a forwardly extending blade having at its forward end a V-shaped cutting edge and at its under side a channel in alinement with said edge.

In testimony whereof I have affixed my signature.

HENRY SCHWARTZ, Jr.